United States Patent
Goto (10) Patent No.: US 12,218,935 B2
(45) Date of Patent: Feb. 4, 2025

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/480,694

(22) Filed: Oct. 4, 2023

(65) Prior Publication Data

US 2024/0031362 A1   Jan. 25, 2024

Related U.S. Application Data

(63) Continuation of application No. 16/384,204, filed on Apr. 15, 2019, now Pat. No. 11,838,116.

(30) Foreign Application Priority Data

Apr. 25, 2018   (JP) .............................. 2018-084476

(51) Int. Cl.
*H04L 9/40* (2022.01)
*H04W 12/06* (2021.01)

(52) U.S. Cl.
CPC ...... *H04L 63/0869* (2013.01); *H04L 63/0876* (2013.01); *H04W 12/06* (2013.01)

(58) Field of Classification Search
CPC ............. H04L 63/0869; H04L 63/0876; H04L 41/0806; H04L 67/34; H04W 12/06;

(Continued)

(56) References Cited

U.S. PATENT DOCUMENTS

| 8,918,500 B2 | 12/2014 | Goto |
| 9,271,312 B2 | 2/2016 | Goto |

(Continued)

FOREIGN PATENT DOCUMENTS

| CN | 106535357 A | 3/2017 |
| JP | 2015-119313 A | 6/2015 |

(Continued)

OTHER PUBLICATIONS

Korean Notice of Allowance issued in corresponding KR Patent Application No. 10-2023-0053706, dated Dec. 4, 2023, with English translation.

(Continued)

*Primary Examiner* — Khoi V Le
(74) *Attorney, Agent, or Firm* — Carter, DeLuca & Farrell LLP (57) ABSTRACT

A communication apparatus receives request regarding a wireless communication parameter setting from another apparatus that has obtained information regarding the communication apparatus by capturing an image indicating information regarding the communication apparatus, accepts a user input regarding whether the parameter setting is to be executed with the other apparatus in a case where the request has been received, and executes the parameter setting with the other apparatus in a case where the user input indicating that a parameter setting is to be executed with the other apparatus has been accepted.

16 Claims, 8 Drawing Sheets

(58) Field of Classification Search
CPC ... H04W 12/50; H04W 12/02; H04W 12/069; H04W 12/77; H04W 76/34; H04W 76/10; H04W 84/12; H04W 88/02; H04W 4/50
See application file for complete search history.

(56) References Cited

U.S. PATENT DOCUMENTS

| | | | |
|---|---|---|---|
| 9,307,387 | B2 | 4/2016 | Sakai et al. |
| 9,497,788 | B2 | 11/2016 | Goto |
| 9,872,129 | B2 | 1/2018 | Goto |
| 9,980,084 | B2 | 5/2018 | Goto |
| 10,200,903 | B2 | 2/2019 | Goto et al. |
| 11,115,816 | B2 | 9/2021 | Goto |
| 11,277,730 | B2 | 3/2022 | Goto |
| 11,678,179 | B2 | 6/2023 | Goto |
| 2016/0150412 | A1 | 5/2016 | Liu |
| 2017/0180342 | A1 | 6/2017 | Hamachi |
| 2017/0215066 | A1 | 7/2017 | Tachibana |
| 2017/0295448 | A1 | 10/2017 | McCann |
| 2018/0069718 | A1 | 3/2018 | Terao |
| 2018/0077255 | A1 | 3/2018 | Goto |
| 2018/0109418 | A1 | 4/2018 | Cammarota et al. |
| 2019/0110222 | A1 | 4/2019 | Goto et al. |
| 2019/0274027 | A1 | 9/2019 | Goto |
| 2019/0303048 | A1 | 10/2019 | Suzuki |
| 2019/0303065 | A1* | 10/2019 | Shibata ............... G06F 3/1236 |
| 2019/0303071 | A1 | 10/2019 | Tsuji |
| 2019/0306919 | A1* | 10/2019 | Miyake ............... G06F 3/1292 |
| 2019/0313246 | A1 | 10/2019 | Nix |
| 2020/0099539 | A1 | 3/2020 | Bernsen et al. |
| 2023/0276232 | A1 | 8/2023 | Goto |

FOREIGN PATENT DOCUMENTS

| | | |
|---|---|---|
| JP | 2016081428 A | 5/2016 |
| JP | 2016-213573 A | 12/2016 |
| JP | 2017130910 A | 7/2017 |
| JP | 2017-135520 A | 8/2017 |
| JP | 2018-037978 A | 3/2018 |
| JP | 2018-037979 A | 3/2018 |
| JP | 2018-042058 A | 3/2018 |
| KR | 1020060113482 A | 11/2006 |
| KR | 1020070081433 A | 8/2007 |
| KR | 1020080096564 A | 10/2008 |
| KR | 10-2018-0030612 A | 3/2018 |
| WO | 2017/013852 A | 1/2017 |
| WO | 2018047653 A1 | 3/2018 |

OTHER PUBLICATIONS

Notice of Reasons for Refusal issued by the Japan Patent Office on Mar. 25, 2022 in corresponding JP Patent Application No. 2018-084476, with English translation.
Korean Office Action issued in corresponding KR Patent Application No. 10-2023-0053706, dated Jun. 12, 2023, with English Translation.
Japanese Office Action issued in corresponding JP Patent Application No. 2018-084476, dated Sep. 22, 2022, with English Translation.
Extended European Search Report issued by the European Patent Office on Aug. 29, 2019 in corresponding European Patent Application No. 19167252.6.
Office Action issued by the China National Intellectual Property Administration on Sep. 1, 2022 in corresponding CN Patent Application No. 201910323424.4.
Extended European Search Report issued by the European Patent Office on Jan. 17, 2022 in corresponding European Patent Application No. 21193174.6.
Extended European Search Report issued in corresponding EP Patent Application No. 23190784.1 dated Oct. 12, 2023.
Korean Office Action issued in corresponding KR Patent Application No. 10-2024-0029680, dated Apr. 16, 2024, with English translation.
Korean Written Decision on Registration issued in corresponding KR Patent Application No. 10-2024-0029680, dated Nov. 25, 2024, with English translation.

* cited by examiner

FIG. 10 ary, and the printer 104 are shown in the example shown in FIG. 1 as communication apparatuses included in the wireless communication system, but the communication
COMMUNICATION APPARATUS, CONTROL METHOD, AND COMPUTER-READABLE STORAGE MEDIUM

CROSS REFERENCE TO RELATED APPLICATIONS

This application is a continuation of U.S. patent application Ser. No. 16/384,204, filed on Apr. 15, 2019, which claims the benefit of and priority to Japanese Patent Application No. 2018-084476, filed Apr. 25, 2018, each of which is hereby incorporated by reference herein in their entirety.

FIELD OF THE INVENTION

The present invention relates to a communication setting technique in wireless communication.

DESCRIPTION OF THE RELATED ART

In recent years, cases where a wireless communication function is provided in electronic devices such as digital cameras, printers, mobile phones, and smartphones, and a service with communication is executed by connecting these electronic devices to a wireless network have increased. In order to connect an electronic device to a wireless network, for example, communication parameters including at least any of an encryption method, an encryption key, an authentication method, and an authentication key need to be set. A Wi-Fi device provisioning protocol (referred to as "DPP" hereinafter) has been formulated as a technique to facilitate setting these communication parameters. The specification of US-2017-0295448 discloses a communication parameter setting technique using DPP including detecting a partner apparatus configured to set communication parameters using a mark such as a QR (quick response) code. The specification of US-2017-0295448 discloses that, with DPP, a providing apparatus (configurator) configured to provide a communication parameter, provides, using a public key, information required for connection to an access point to a receiving apparatus (enrollee) configured to receive a communication parameter.

With a parameter setting method such as DPP with which a public key is obtained by reading a QR code (registered trademark) and authentication is executed, an apparatus configured to capture a QR code can identify an apparatus whose QR code is to be captured, but the apparatus whose QR code is to be captured cannot identify the apparatus configured to capture the QR code. Thus, in the apparatus that is to be captured, the setting of parameters may be executed between this apparatus and an undesired apparatus.

SUMMARY OF THE INVENTION

The present invention enables a communication apparatus to execute the setting of communication parameters between the communication apparatus and an appropriate partner apparatus.

According to one aspect of the present invention, there is provided a communication apparatus comprising: a receiving unit configured to receive a request regarding a wireless communication parameter setting from another apparatus that has obtained information regarding the communication apparatus by capturing an image indicating information regarding the communication apparatus; an accepting unit configured to, in a case where the request has been received by the receiving unit, accept a user input regarding whether the parameter setting is to be executed with the other apparatus; and an executing unit configured to, in a case where the user input indicating that a parameter setting is to be executed with the other apparatus has been accepted, execute the parameter setting with the other apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment of the present invention will now be described in detail with reference to the drawings. It should be noted that the relative arrangement of the components, the numerical expressions, and numerical values set forth in the embodiment do not limit the scope of the present invention unless it is specifically stated otherwise.

In the present embodiment, an example in which a wireless LAN system conforming to IEEE 802.11 standard series is used will be described. However, the present invention is not limited thereto, and the following method can be applied to other wireless communication systems that do not conform to IEEE 802.11 standard series. Note that "IEEE" is an abbreviation for "The Institute of Electrical and Electronics Engineers, Inc."

Configuration of Wireless Communication System

Figure 1:
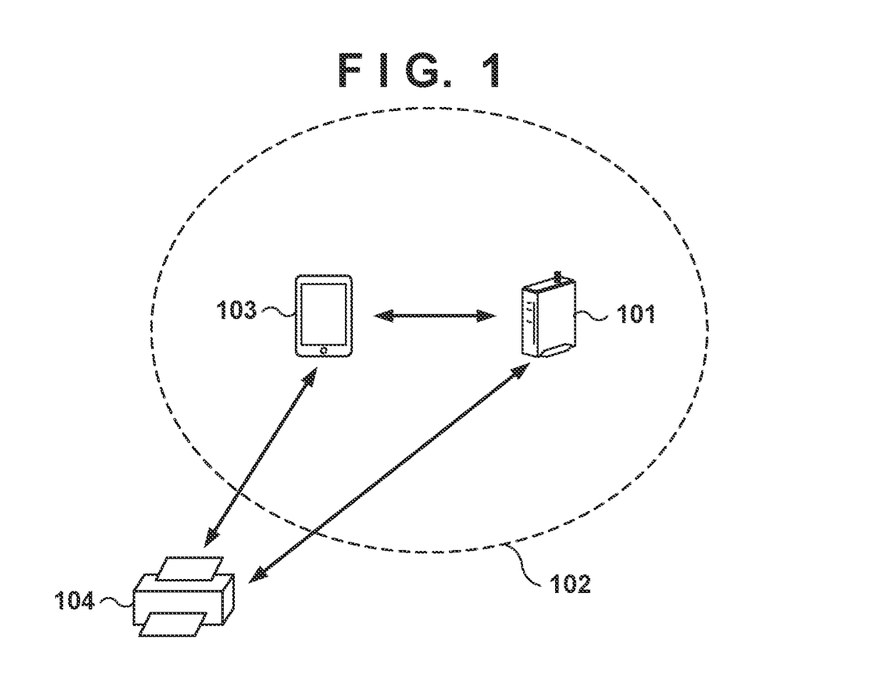
FIG. 1 is a diagram showing a configuration example of a wireless communication system.

FIG. 1 shows a configuration of a wireless communication system according to the present embodiment. This wireless communication system includes an access point 101, a smartphone 103, a printer 104, and a network 102 of a wireless LAN. Note that the access point 101, the smartphone 103, and the printer 104 are shown in the example shown in FIG. 1 as communication apparatuses included in the wireless communication system, but the communication apparatuses included in the wireless communication system are not limited thereto. For example, these communication apparatuses may be replaced with communication apparatuses in other modes, such as mobile phones, cameras, personal computers (PCs), video cameras, smart watches, and personal digital assistants (PDAs). Also, although the number of communication apparatuses included in the wireless communication system is three in the example shown in FIG. 1, two, or four or more communication apparatuses may be included in the wireless communication system.

In the present embodiment, processing performed when the printer 104 joins the network 102 formed by the access point 101 will be described. At this time, for example, the smartphone 103 may operate as the configurator of DPP, and provide information for connection to the access point 101 to the printer 104 that operates as the enrollee of DPP. Note that, as described above, DPP is an abbreviation for WiFi Device Provisioning Protocol. Also, the configurator is a providing apparatus configured to provide communication parameters, and the enrollee is a receiving apparatus configured to receive provided communication parameters. Communication parameters are pieces of information used for connection to an apparatus that forms a network, such as an access point, and are pieces of information such as an SSID that is a network identifier, an encryption key, and an encryption method, for example.

In the present embodiment, the initiator configured to start setting parameters using DPP captures an image such as a QR code displayed on the responder configured to execute the parameter setting together with the initiator, obtains a public key, and executes the parameter setting using this public key. The initiator and the responder are determined irrespective of roles in communication parameter providing processing. That is, the configurator can operate as either the initiator or the responder, and similarly, the enrollee can also operate as either the initiator or the responder. As described above, in the parameter setting processing using DPP, the initiator identifies the partner apparatus configured to transmit and receive communication parameters, and reads an image such as a QR code, while the responder cannot identify which communication apparatus has read this image. Thus, the responder may execute the parameter setting using DPP on an inappropriate partner apparatus. To address this, in the present embodiment, when the responder receives a predetermined signal (a DPP authentication request, for example) that is transmitted by the initiator to the responder after an image such as a QR code has been read, the responder enters a state in which a user input can be accepted. For example, the responder displays, on the screen, apparatus information regarding the initiator that can be acquired from a request signal, and accepts a user input as to whether the partner apparatus in which parameters are set is desired by the user. Then, the parameter setting processing using DPP is continued in response to the user input indicating that the initiator is approved of as the partner apparatus in which parameters are set being accepted by the responder. Accordingly, the communication apparatus can exchange parameters with the other apparatus that was confirmed by the user, and it is possible to prevent the communication apparatus from exchanging communication parameters with an inappropriate apparatus, and the like.

Hereinafter, examples of configurations of communication apparatuses configured to execute such processing and the flow of processing executed will be described in detail.

Configurations of Apparatuses

Figure 2:
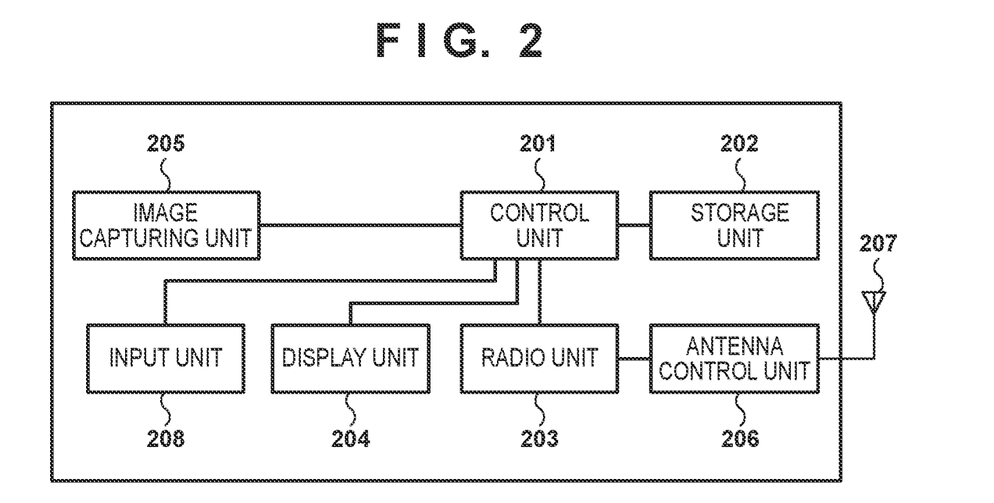
FIG. 2 is a diagram showing an example of a hardware configuration of a communication apparatus.

FIG. 2 shows an example of a hardware configuration of communication apparatuses (the access point 101, the smartphone 103, and the printer 104) according to the present embodiment. A communication apparatus includes a control unit 201, a storage unit 202, a radio unit 203, a display unit 204, an image capturing unit 205, an antenna control unit 206, an antenna 207, and an input unit 208, as an example.

The control unit 201 performs overall control of the communication apparatus by executing a control program stored in the storage unit 202. The control unit 201 is constituted by one or more processors such as a CPU (central processing unit) and an MPU (micro processing unit). Also, the control unit 201 may be constituted by hardware such as ASIC (application specific integrated circuit) and a DSP (digital signal processor) and a gate array circuit such as an FPGA (field programmable gate array). The storage unit 202 stores various types of information such as a control program executed by the control unit 201, image data, and communication parameters. Various operations, which will be described later, may be realized by the control unit 201 executing the control program stored in the storage unit 202. The storage unit 202 may be constituted by a ROM (read only memory), a RAM (random access memory), an HDD (hard disk drive), or a flash memory, or a storage medium such as a detachable SD (secure digital) card, for example.

The radio unit 203 executes various processes for performing wireless LAN communication conforming to the IEEE 802.11 standard series. The radio unit 203 is constituted by a circuit chip provided with a wireless communication circuit such as a radio frequency (RF) circuit or a baseband (BB) circuit. The display unit 204 presents various types of information to an external portion using a function that can output information that can be visually recognized, such as an LCD (liquid crystal display) or an LED (light-emitting diode), or using a function that can output sound, such as a speaker. That is, the display unit 204 has a function of outputting at least one of visual information and sound information. Note that, if the display unit 204 displays visual information, the display unit 204 has a VRAM (video RAM) capable of storing image data corresponding to visual information to be displayed, for example, and may, in relation to an LCD or LED, perform display control to continuously display image data stored in the VRAM.

The image capturing unit 205 is constituted by an image sensor, a lens, and the like, and captures a photograph and a moving image. The image capturing unit 205 can capture images such as a barcode, a two-dimensional code, and a QR code (registered trademark). The antenna control unit 206 controls the antenna 207, and the antenna 207 is any type of antenna having an operation band in a 2.4 GHz band and/or a 5 GHz band. The input unit 208 is an accepting apparatus configured to accept various user inputs, and is used when the user operates the communication apparatus. The input unit 208 stores a flag corresponding to the accepted user input in a memory such as the storage unit 202 or the like.

Note that the configuration example shown in FIG. 2 is an example, and a communication apparatus may have another hardware configuration, or does not necessarily have a part of the hardware. For example, if the communication apparatus is a printer, the communication apparatus may have a printing unit, in addition to the configuration shown in FIG. 2. Also, if the communication apparatus is the access point 101, the communication apparatus does not necessarily have the display unit 204 or the image capturing unit 205. Also, the above-described two or more blocks may be integrated into one. For example, if the communication apparatus is the smartphone 103, a touch panel obtained by integrating at least portions of the display unit 204 and the input unit 208 may be used. Also, one block may be divided into two or more blocks.

Figure 3:
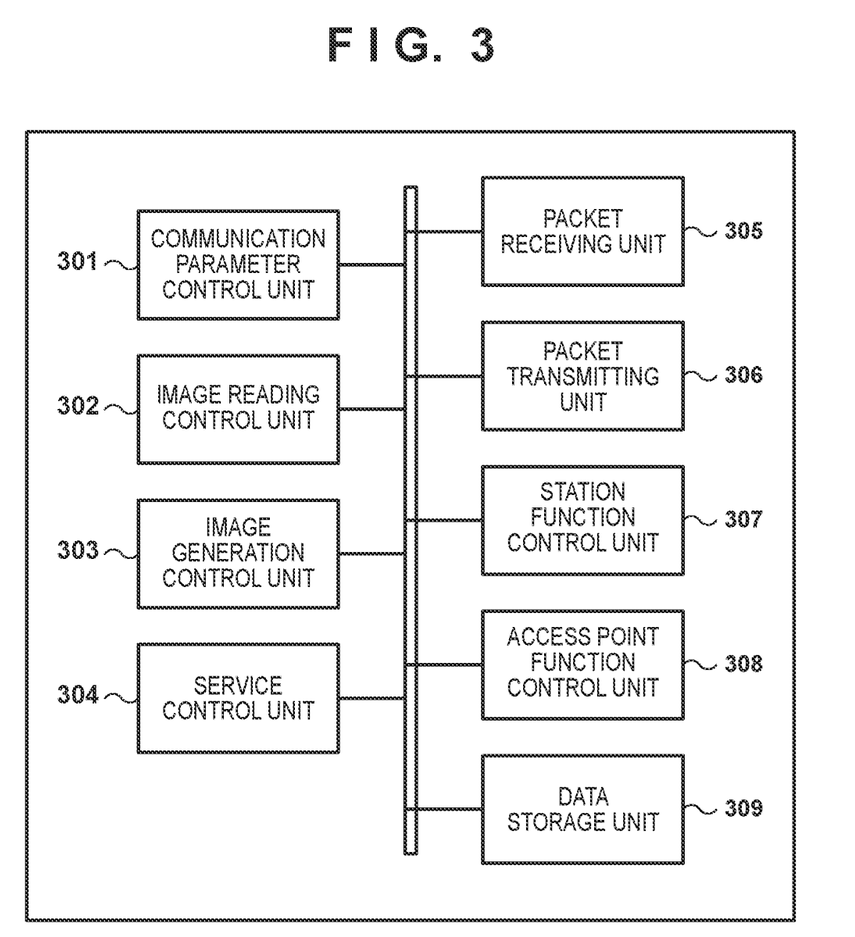
FIG. 3 is a diagram showing an example of a functional configuration of the communication apparatus.

FIG. 3 is a diagram showing an example of a functional configuration of the communication apparatus. Note that FIG. 3 shows functions mainly for executing processing, which will be described later, and the communication apparatus may have functions other than the functions shown in FIG. 3.

The communication apparatus includes a communication parameter control unit 301, an image reading control unit 302, an image generation control unit 303, and a service control unit 304, as the functional configuration, for example. Also, the communication apparatus includes a packet receiving unit 305, a packet transmitting unit 306, a station function control unit 307, an access point function control unit 308, and a data storage unit 309, for example. These function blocks may be realized by the control unit 201 executing the respective programs stored in the storage unit 202. For example, as a result of controlling hardware, and calculating and processing information according to a control program, the control unit 201 realizes functions. Note that some or all of the functions may be realized by dedicated hardware such as an ASIC.

The communication parameter control unit 301 executes communication parameter sharing processing for sharing communication parameters between apparatuses. In the communication parameter sharing processing, the providing apparatus provides communication parameters for executing wireless communication to the receiving apparatus. Herein, communication parameters include at least any one of wireless communication parameters required to perform wireless LAN communication, such as an SSID (service set identifier) that is a network identifier, an encryption method, an encryption key, an authentication method, and an authentication key. Also, communication parameters may include a connector defined in DPP, a MAC address, a PSK, a passphrase, an IP address for performing communication in an IP layer, information required for a higher-level service, and the like. Note that "MAC" is an acronym for "Medium Access Control", "PSK" is an acronym for "Pre Shared Key", and "IP" is an acronym for "Internet Protocol". In the present embodiment, it is assumed that the communication parameter control unit 301 executes communication parameter sharing processing using DPP. However, the communication parameter control unit 301 may execute communication parameter sharing processing using WPS (Wi-Fi protected setup), Wi-Fi Direct, or the like, instead of using DPP.

The image reading control unit 302 analyzes an image such as a barcode, a two-dimensional code, or a QR code captured by the image capturing unit 205, and obtains encoded information. The image reading control unit 302 obtains, as the image captured by the image capturing unit 205, code information including a public key to be used to execute communication parameter sharing processing. Note that code information may be a two-dimensional code such as a CP (computer purpose) code or a QR code, or a one-dimensional code such as a barcode. The image reading control unit 302 analyzes the image of the obtained code information and obtains encoded information. In the present embodiment, code information may include information to be used in communication parameter sharing processing. Herein, information used in communication parameter sharing processing includes information such as a public key used in authentication processing and an identifier of an apparatus, for example. Note that a public key is one type of encryption key used in a public key encryption method, and is information used to increase the security of communication parameter sharing processing. Note that information such as a certificate or a password may be used, instead of a public key. The image generation control unit 303 generates an image such as a barcode, a two-dimensional code, or a QR code, and executes control for displaying the generated image on the display unit 204. The image generation control unit 303 generates code information including information such as a public key used to execute communication parameter sharing processing and the identifier of a communication apparatus. Note that as a result of attaching code information that has been generated in advance to the body of a communication apparatus, to a product instruction manual of a communication apparatus, or packaging of the product (for example, a box), for example, code information may be displayed in a communication apparatus without a screen display. This makes it possible to execute processing according to the present embodiment even if a communication apparatus does not include the display unit 204.

The service control unit 304 controls a service in an application layer. An "application layer" herein refers to a service providing layer in an upper layer such as a fifth layer or an upper layer in an OSI reference model. The service control unit 304 executes control on printing processing, image streaming processing, and file transfer processing, using wireless communication performed by the radio unit 203.

The packet receiving unit 305 and the packet transmitting unit 306 control transmission and reception of any packets including a communication protocol of an upper layer. For example, the packet receiving unit 305 and the packet transmitting unit 306 control the radio unit 203 in order to transmit and receive packets conforming to IEEE 802.11 standard series to/from a communication partner apparatus.

The station function control unit 307 provides an STA function for operating as a station (STA) in an infrastructure mode of IEEE 802.11 standard series. When the station function control unit 307 operates as an STA, the station function control unit 307 executes authentication/encryption processing, and the like. Also, the access point function control unit 308 provides an AP function for operating as an access point (AP) in an infrastructure mode of IEEE 802.11 standard series. The access point function control unit 308 forms a wireless network, and performs authentication/encryption processing on the STA and manages the STA. The data storage unit 309 performs control of writing and reading out software and information regarding communication parameters and barcodes to/from the storage unit 202.

Note that the communication apparatus does not necessarily have a part of the configuration shown in FIG. 3, and in some cases, the entire configuration may be replaced with another configuration capable of exhibiting a function that is similar to the configuration shown in FIG. 3. For example, if the communication apparatus is the access point 101, the communication apparatus does not necessarily have the image reading control unit 302 and the like. Also, as a result of attaching code information that has been generated in advance to the body of the communication apparatus or the like, if code information is displayed without a screen display, the image generation control unit 303 may be omitted.

Flow of Processing

Next, an example of a flow of processing executed by the above-described communication apparatuses will be described. Hereinafter, first, the flow of processing executed by the responder and the initiator of DPP will be described, and then, an example of the flow of processing executed by a wireless communication system will be described.

Operations of Responder Communication Apparatus

Figure 4:
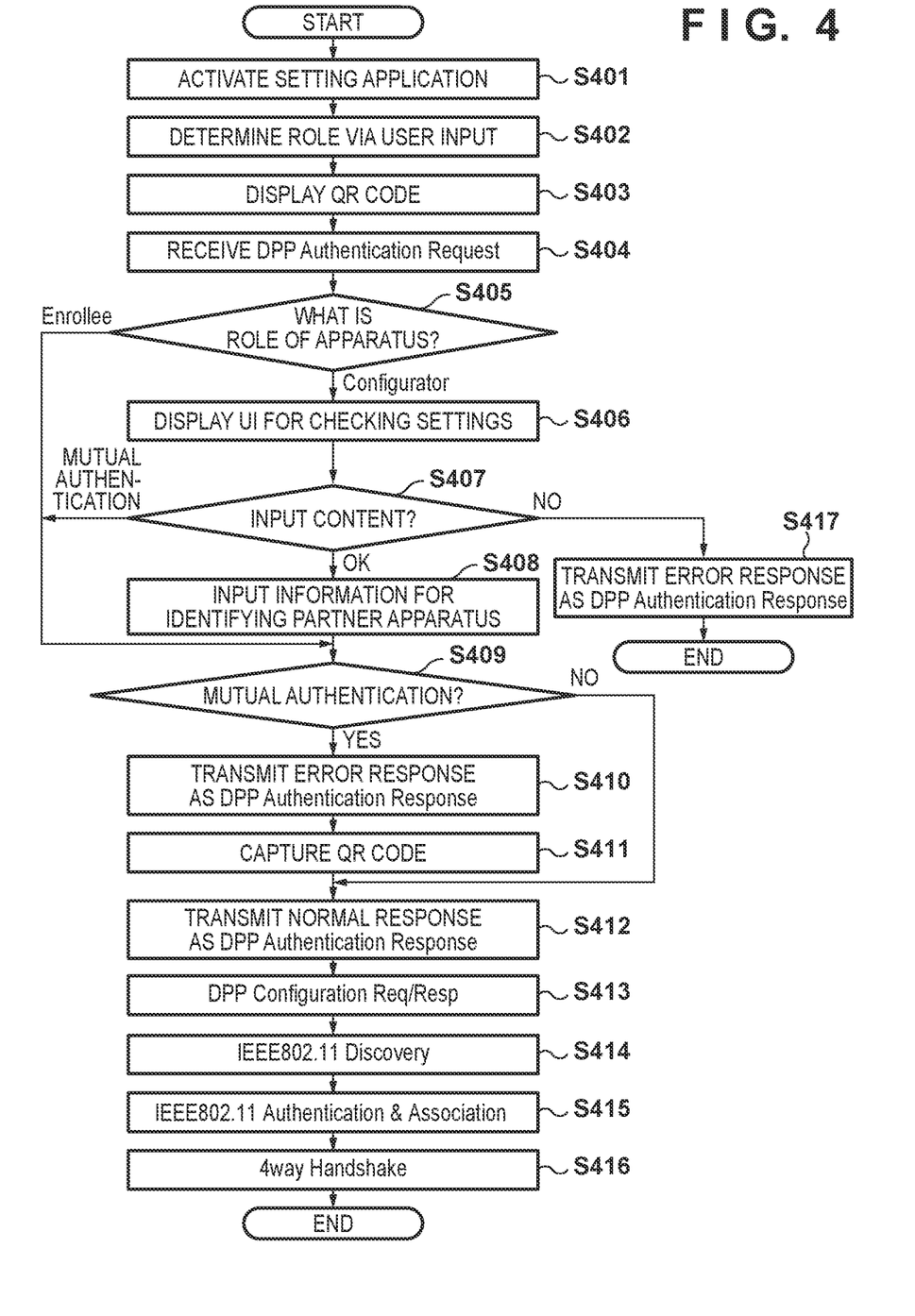
FIG. 4 is a flowchart showing an example of a flow of processing executed by a responder communication apparatus in DPP.

FIG. 4 shows an example of the flow of processing executed by the communication apparatus operating as the responder (referred to as a "responder apparatus" hereinafter). The responder apparatus first activates an application for executing the communication parameter setting using DPP via a user input, for example (step S401). Then, the responder apparatus determines, via a user operation, for example, which role of the communication parameter providing apparatus (the configurator) and the communication parameter receiving apparatus (the enrollee) to operate in (step S402). Note that the responder apparatus may operate in a preset role, independently of a user operation, for example. For example, if the responder apparatus is an access point, the responder apparatus may always operate as the configurator. Then, the responder apparatus displays an image of the code information such as a QR code indicating information regarding the responder apparatus, such as the public key of the responder apparatus, via the display unit 204, for example (step S403). Note that the responder apparatus may display code information in a format in which the printed image is attached to the body, for example, and in this case, no special processing may be executed in step S403. An image of code information is captured by an initiator communication apparatus (referred to as an "initiator apparatus" hereinafter). The initiator apparatus analyzes the captured image of code information, obtains information regarding the responder apparatus, and then transmits a DPP authentication request packet to the responder apparatus. The responder apparatus then receives this DPP authentication request packet (step S404).

Figure 6:
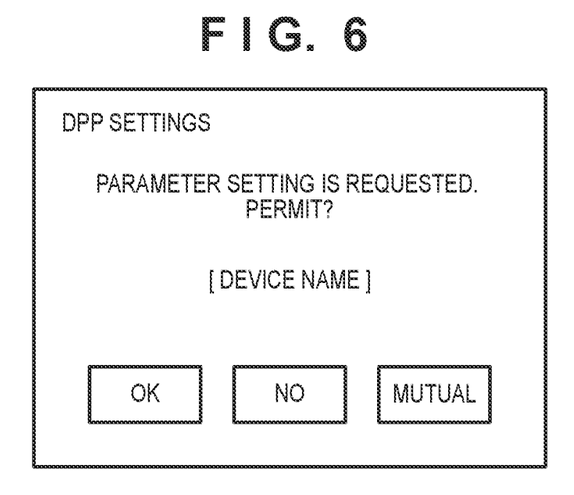
FIG. 6 is a diagram showing an example of a user interface displayed by the communication apparatus.

The responder apparatus then checks the role of the responder apparatus (the configurator or the enrollee) in the communication parameter providing processing determined in step S402 (step S405). If it is determined that the responder apparatus is operating as the configurator, the responder apparatus displays a user interface (UI) for checking the settings (step S406). An example of this UI is shown in FIG. 6. In one example, as shown in FIG. 6, the responder apparatus presents the device name of the initiator apparatus to the initiator apparatus, and enters a state in which a user input regarding whether or not the execution of the communication parameter setting processing with this initiator apparatus is permitted can be accepted. Note that a MAC address of the initiator apparatus, information that has been set in the DPP authentication request packet as additional information and with which the initiator apparatus can be identified, and the like are displayed in a "Device Name" region shown in FIG. 6. Three options "OK", "NO", and "Mutual" are presented in the UI shown in FIG. 6, and a user selects one of these options. Herein, "OK" is an option indicating that the communication parameter setting processing with the displayed initiator apparatus is permitted, and "NO" is an option indicating that the communication parameter setting processing with the displayed initiator is not permitted. Also, "Mutual" is an option indicating that mutual authentication processing is executed by the responder apparatus capturing an image of code information such as a QR code displayed by the initiator apparatus, and the communication parameter setting processing is executed in a state in which code information is obtained mutually.

Note that, if the responder apparatus permits the communication parameter setting processing with the initiator apparatus, the responder apparatus may be designated to execute either "OK" or "Mutual" as the initial setting. In this case, only "OK" is displayed on the UI shown in FIG. 6, for example, and if this "OK" is selected as a user input, this user input is interpreted as "OK" or "Mutual" based on the initial setting.

Figure 7:
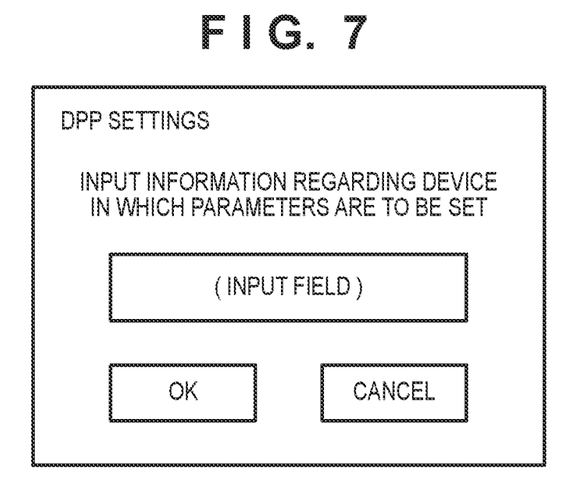
FIG. 7 is a diagram showing an example of a user interface displayed by the communication apparatus.

When the user operation is accepted, the responder apparatus determines which option is selected from these options by the user (step S407). If the responder apparatus has determined that "NO" was selected in step S407, the responder apparatus transmits, to the initiator apparatus, an error response as a DPP authentication response packet (step S417), and ends processing. If the responder apparatus has determined that "OK" was selected in step S407, the responder apparatus displays a UI for allowing the user to input information regarding the initiator apparatus, which is the partner apparatus for the communication parameter setting processing, and enters a user input accepting state (step S408). An example of a UI displayed in step S408 is shown in FIG. 7. The user inputs information regarding the initiator apparatus in an "Input Field" shown in FIG. 7. Information to be input herein may be information that is similar to information that can be obtained in step S411, which will be described later, for example. For example, as a result of the responder apparatus obtaining a file regarding information regarding the initiator apparatus via the Internet or the like in advance and designating this file, the information regarding the initiator apparatus may be input. Also, information to be input may be different from information that can be obtained in step S411, which will be described later. For example, the responder apparatus may accept a manual input made by the user, such as information with which the initiator apparatus can be identified. When the responder apparatus accepts an input made by the user with regard to the information regarding the partner apparatus in step S408 (NO in step S409), the processing then proceeds to step S412.

On the other hand, if the responder apparatus has determined that "Mutual" was selected in step S407, the processing proceeds to step S410 without the processing of step S408 being executed (YES in step S409). In step S410, in order to prompt the initiator apparatus to display code information such as a QR code, the responder apparatus transmits an error response as a DPP authentication response packet. The initiator apparatus displays code information in response to the error response as this DPP authentication response packet. The responder apparatus waits for the initiator apparatus to display code information, and when code information is displayed, the responder apparatus captures an image of this code information (step S411) and obtains information regarding the initiator apparatus. The information obtained here may be information such as a public key of the initiator apparatus, for example. When the responder apparatus obtains information regarding the initiator apparatus, the responder apparatus then transmits a normal response as a DPP authentication response packet (step S412). Then, the responder apparatus executes parameter exchange based on the specification of DPP, and executes processing for connection to the initiator apparatus (steps S413 to S416).

Operations of Initiator Communication Apparatus

Figure 5:
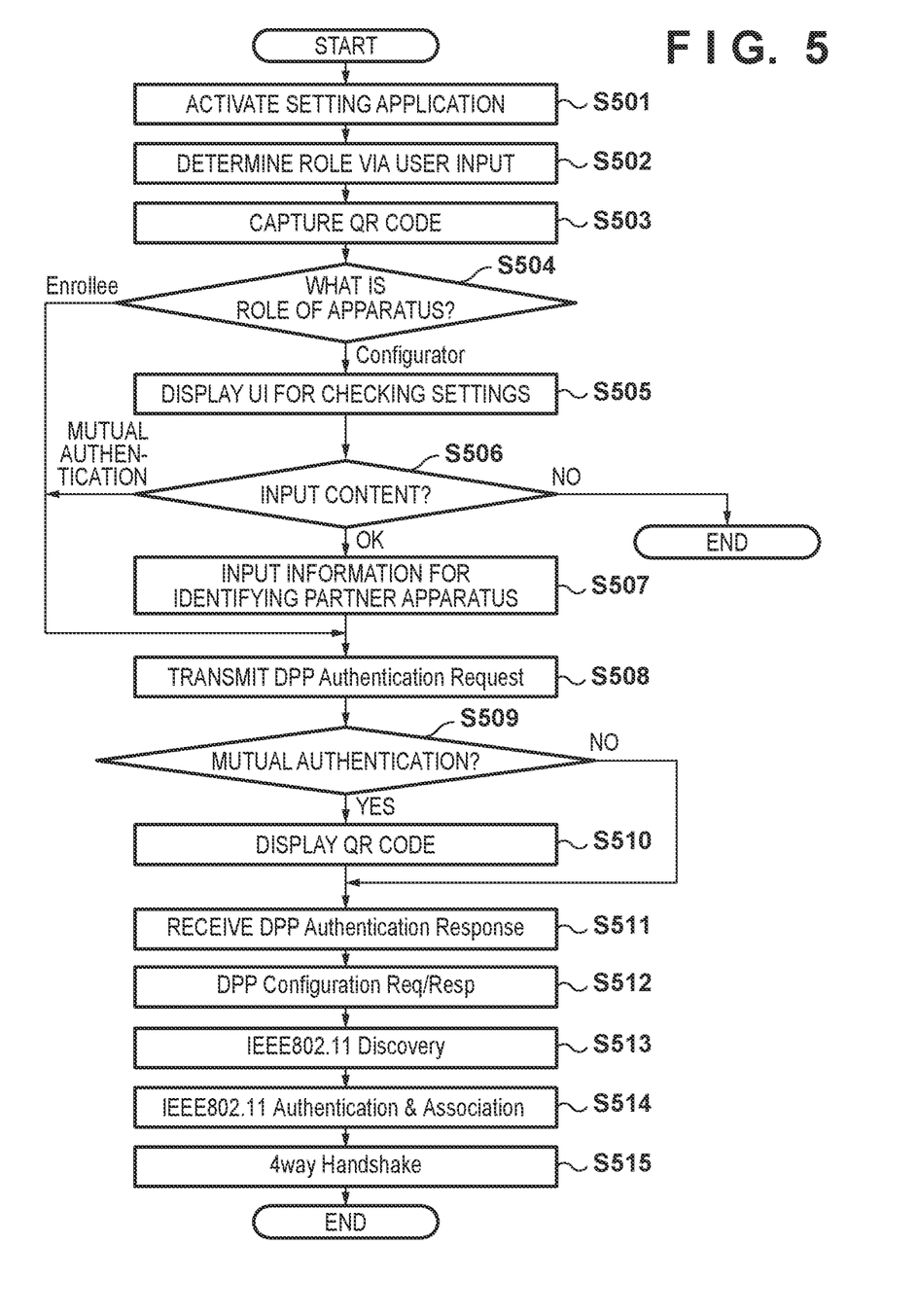
FIG. 5 is a flowchart showing an example of a flow of processing executed by an initiator communication apparatus in DPP.

Next, an example of a flow of processing executed by the initiator apparatus will be described with reference to FIG. 5. The initiator apparatus first activates an application for executing the communication parameter setting using DPP via a user input, for example (step S501). Then, the initiator apparatus determines, via a user operation, for example, which role of the communication parameter providing apparatus (the configurator) and the communication parameter receiving apparatus (the enrollee) to operate in (step S502). The initiator apparatus then captures an image of code information such as a QR code including the public key displayed on the responder apparatus (step S503), and obtains information regarding the responder apparatus. The initiator apparatus transmits a DPP authentication request packet to the responder apparatus in response to this information being obtained (step S508).

Note that the initiator apparatus may execute processing similar to that of steps S405 to S408 before transmitting a DPP authentication request packet to the responder apparatus. However, for example, if it is thought that the initiator apparatus can select, without error, the partner apparatus on which the communication parameter setting processing is executed, start reading the code information, and reliably identify the responder apparatus, these processes are not necessarily executed.

If the initiator apparatus is operating as the configurator, the initiator apparatus may display the obtained information regarding the partner apparatus using code information (step S505), and accept a user input regarding whether or not the communication parameter setting processing with this partner apparatus is permitted. If code information regarding an undesired partner apparatus has been read, for example, as a result of "NO" being selected in step S506, the communication parameter setting processing may end without transmission of a DPP authentication request packet. Also, if "OK" has been selected in step S506, the initiator apparatus may display the UI shown in FIG. 7, for example, and prompt information regarding the partner apparatus to be input (step S507). In one example, the initiator apparatus may accept an input regarding information such as the name of the partner apparatus. The initiator apparatus then transmits a DPP authentication request packet. The initiator apparatus then receives a normal response from the responder apparatus as a DPP authentication response packet (step S511).

Also, if "Mutual" is selected in step S506, the initiator apparatus transmits a DPP authentication request packet without executing the processing in step S507. Then, the initiator apparatus displays code information such as a QR code on the display unit 204 in response to the reception of the error response from the partner apparatus as a DPP authentication response packet, for example (step S510). Also, if "Mutual" is selected, the initiator apparatus may display code information when a predetermined time period has elapsed after a DPP authentication request packet is transmitted. The initiator apparatus then receives the normal response as a DPP authentication request packet after the responder apparatus obtains this code information (step S511).

Then, the initiator apparatus executes parameter exchange based on the specification of DPP, and executes processing for connection to the responder apparatus (steps S512 to S515).

As described above, according to the present embodiment, the communication parameter setting utilizing code information such as a QR code enables the user of the responder apparatus to identify the initiator apparatus (the initiator apparatus checks the responder apparatus as needed). Then, after the user permits the initiator apparatus, communication parameters can be provided and received between these communication apparatuses.

Flow of Processing in Overall Wireless Communication System

Next, an example of a flow of processing executed in a wireless communication system including the initiator apparatus and the responder apparatus described above will be described. As described above, in the wireless communication system according to the present embodiment, the network 102 is constructed by the access point 101, and the smartphone 103 holds communication parameters with which the smartphone 103 can be connected to the access point 101. For example, if the access point 101 does not support DPP, the smartphone 103 may obtain communication parameters using an existing protocol such as a WPS or an AOSS (AirStation One-Touch Secure System). Also, if the access point 101 supports DPP, the smartphone 103 may use automatic setting or the like using DPP. Note that, although a case where the access point 101 provides the smartphone 103 with communication parameters with regard to the wireless communication system shown in FIG. 1 will be described in the present embodiment, configurations other than such a configuration may also be used. For example, a group owner of Wi-Fi Direct (registered trademark) may operate in a similar manner to the access point 101 according to the present embodiment, provide a client with the communication parameters, and this client may provide another client with the communication parameters. Also, the user of the smartphone 103 may manually input communication parameters via the input unit 208. It is assumed that, then, the smartphone 103 executes, as the configurator of DPP, communication parameter setting processing with the enrollee (the printer 104). At this time, flows of processing in a case where the smartphone 103 (the configurator) is an initiator and mutual authentication is not performed, a case where the smartphone 103 is a responder and mutual authentication is not performed, and a case where the smartphone 103 is a responder and mutual authentication is performed will be described below.

Figure 8:
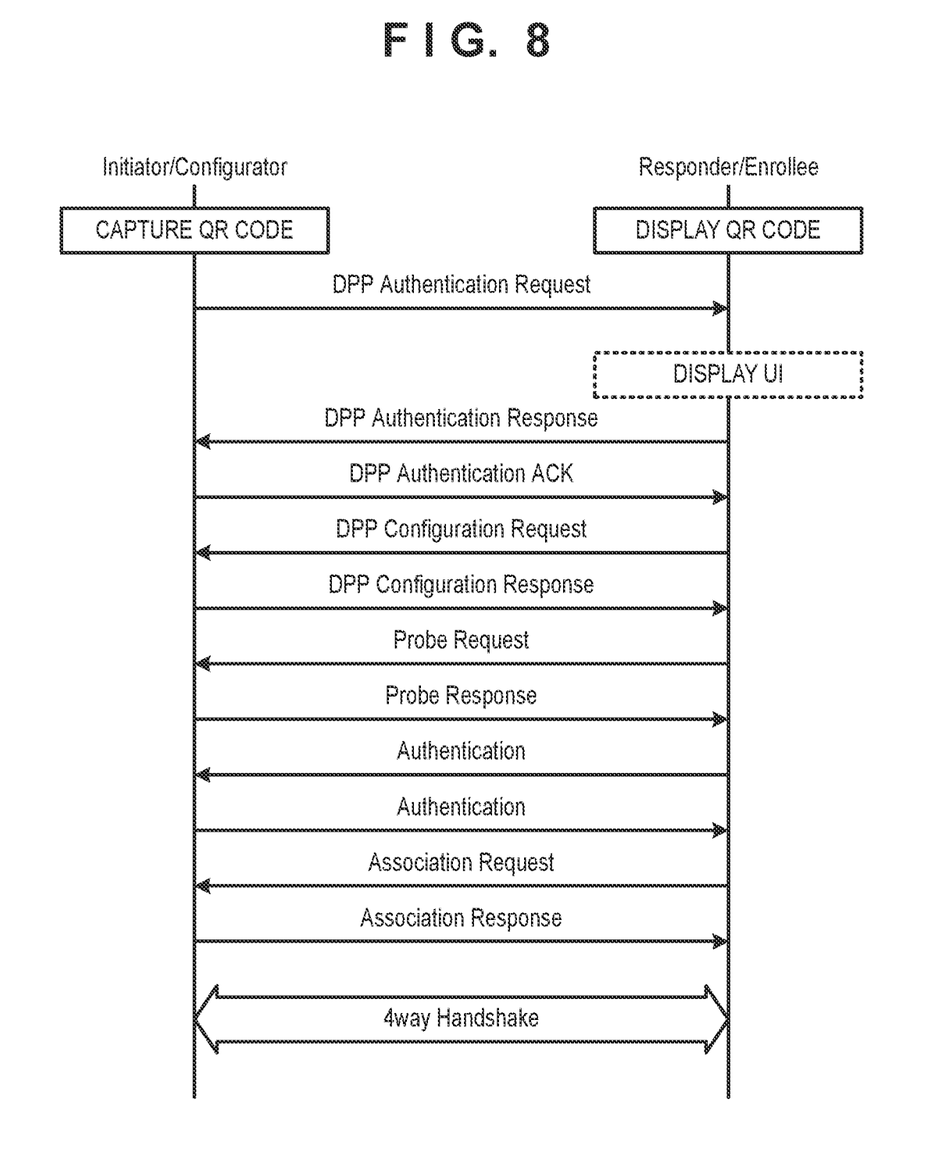
FIG. 8 is a diagram showing a first example of a flow of processing executed by a wireless communication system.

FIG. 8 shows an example of the flow of processing in the case where the configurator is the initiator and mutual authentication is not performed. In this processing, first, the responder apparatus displays a QR code, and the initiator apparatus captures the QR code displayed on the responder apparatus. The initiator apparatus transmits a DPP authentication request packet to the responder apparatus, triggered by this QR code being captured. When the responder apparatus receives the DPP authentication request packet, the responder apparatus displays a UI screen as shown in FIG. 6 as needed. Note that there are cases where communication parameter setting processing is permitted independent of the partner apparatus (the initiator apparatus), such as a case where the responder apparatus is an enrollee and a case where it is sufficient to select whether or not the received parameters are to be used later. In such cases, the responder apparatus does not necessarily display the UI screen. Note that as a result of the responder apparatus displaying the UI screen and permitting the communication parameter setting processing only with a specific initiator apparatus, it is possible to prevent the execution of unnecessary communication parameter setting processing. If the UI screen is displayed, the responder apparatus transmits, to the initiator apparatus, a DPP authentication response packet in response to "OK" being pressed by the user on this UI screen. Then, parameter exchange is executed and processing for connection between the responder apparatus and the initiator apparatus is executed based on the specification of DPP.

Figure 9:
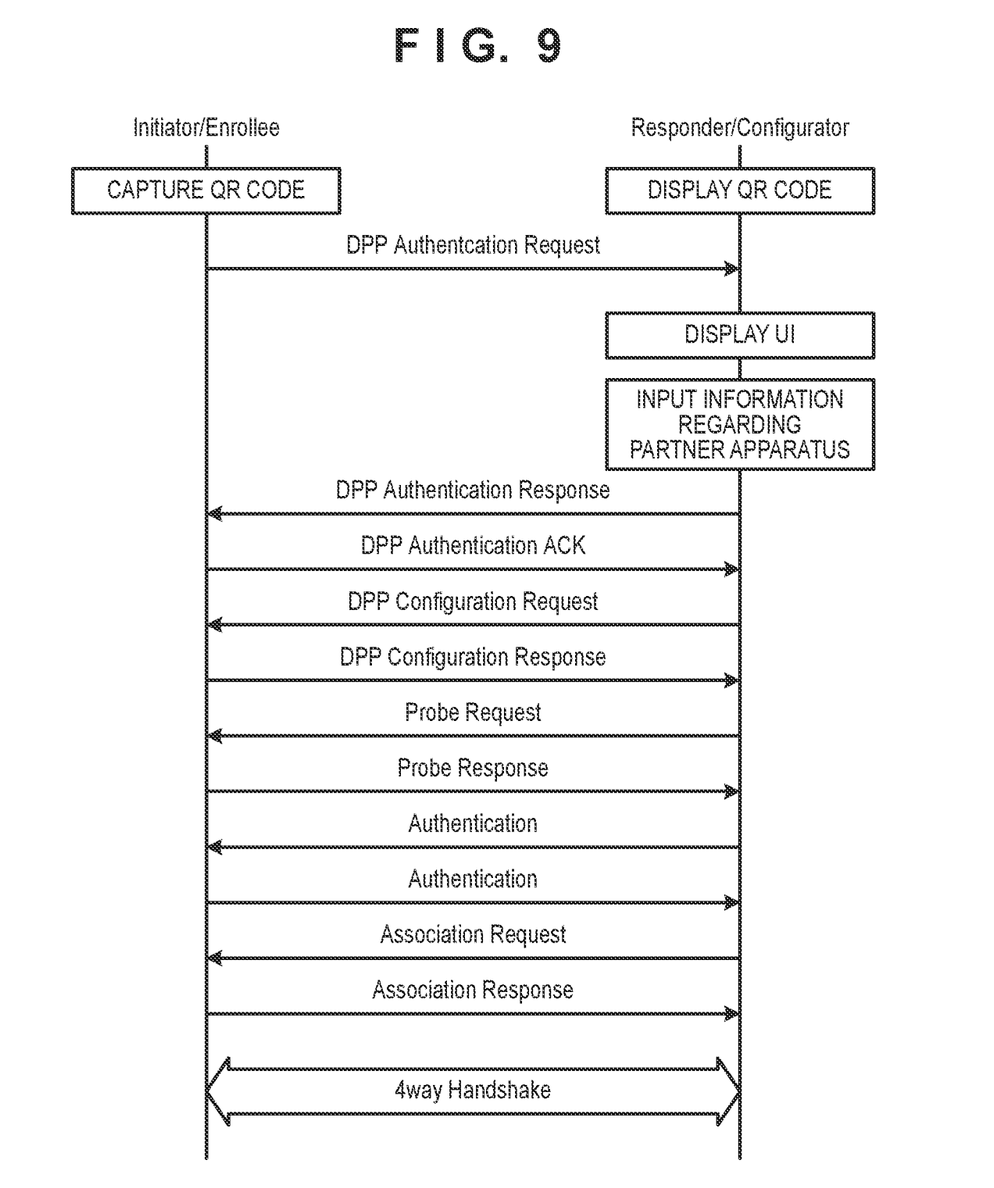
FIG. 9 is a diagram showing a second example of a flow of processing executed by the wireless communication system.

FIG. 9 shows an example of the flow of processing in the case where the enrollee is the initiator and mutual authentication is not performed. In this processing, first, the responder apparatus also displays a QR code, and the initiator apparatus also captures the QR code displayed on the responder apparatus. The initiator apparatus transmits a DPP authentication request packet to the responder apparatus, triggered by this QR code being captured. When the responder apparatus receives this DPP authentication request packet, the responder apparatus displays the UI screen as shown in FIG. 6. The MAC address of the initiator apparatus and information for identifying the initiator apparatus set as additional information in the DPP authentication request packet are displayed in "Device Name" shown in FIG. 6. In a case where the responder apparatus is a communication parameter providing apparatus (the configurator), if the responder apparatus provides communication parameters without identifying the initiator apparatus, a desired communication apparatus may be allowed to join a network. Thus, in this processing example, the responder apparatus functioning as the configurator provides the user with information for identifying the initiator apparatus, which is an enrollee candidate, and accepts a user operation regarding whether or not communication parameter setting processing with this initiator apparatus may be executed. Accordingly, it is possible to execute communication parameter setting processing only with the partner apparatus on which the user has determined that the communication parameter setting processing may be executed. The responder apparatus displays the UI screen as shown in FIG. 7 in response to "OK" being pressed by the user on the UI screen, and accepts a user input regarding information related to the partner apparatus on which the communication parameter setting processing is executed. The responder apparatus accepts this user input, and then transmits a DPP authentication response packet to the initiator apparatus. Then, parameter exchange is executed and processing for connection between the responder apparatus and the initiator apparatus is executed based on the specification of DPP.

Figure 10:
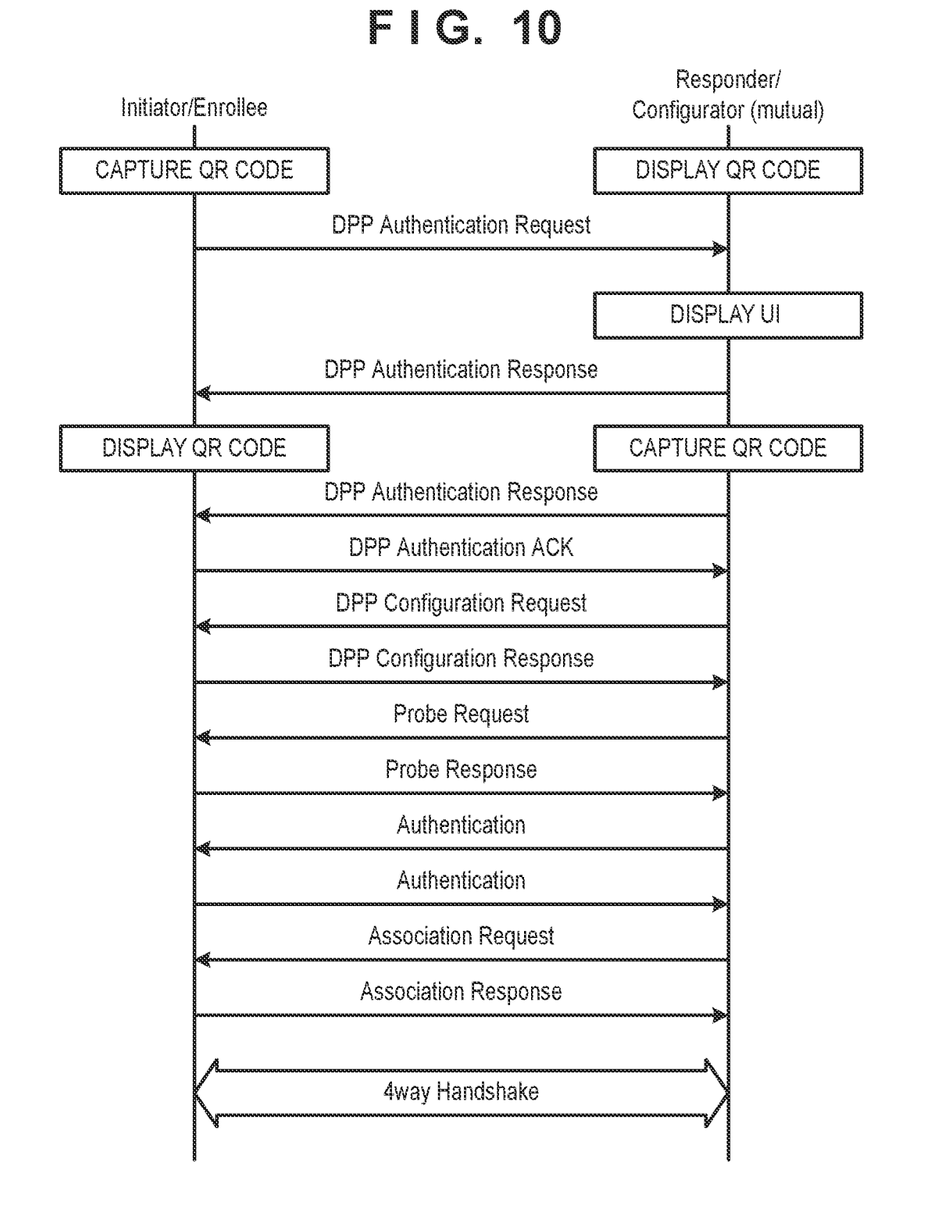
FIG. 10 is a diagram showing a third example of a flow of processing executed by the wireless communication system.

FIG. 10 shows an example of the flow of processing in the case where mutual authentication is performed. Note that, although the processing example shown in FIG. 10 shows a processing example in a case where the enrollee is the initiator, even if the configurator is the initiator, similar processing may be executed. In this processing, first, the responder apparatus also displays a QR code, and the initiator apparatus also captures the QR code displayed on the responder apparatus. The initiator apparatus transmits a DPP authentication request packet to the responder apparatus, triggered by this QR code being captured. When the responder apparatus receives this DPP authentication request packet, the responder apparatus displays the UI screen as shown in FIG. 6. When "Mutual" is pressed by the user, the responder apparatus transmits an error response as a DPP authentication response packet to the initiator apparatus, and waits for the initiator apparatus to display a QR code. Then, the initiator apparatus displays a QR code, and the responder apparatus captures the QR code displayed on the responder apparatus. When the responder apparatus obtains information regarding the initiator apparatus, the responder apparatus then transmits a normal response as a DPP authentication response packet to the initiator apparatus. Then, parameter exchange is executed and processing for connection between the responder apparatus and the initiator apparatus is executed based on the specification of DPP.

As described above, the responder apparatus of DPP allows the user to check the information regarding the initiator apparatus, and displays the UI screen for allowing a user operation regarding whether the execution of communication parameter setting processing with this initiator apparatus is permitted to be accepted, based on the result of checking. In one example, the responder apparatus displays this UI screen based on reception of a DPP authentication request packet. The responder apparatus continues communication parameter setting processing using DPP based on acceptance of a user operation indicating that communication parameter setting processing with the initiator apparatus is permitted. On the other hand, if the responder apparatus accepts a user operation indicating that communication parameter setting processing with the initiator apparatus is not permitted, the processing ends without continuing communication parameter setting processing using DPP. Accordingly, it is possible to prevent communication parameters from being exchanged between communication apparatuses that are not desired by the user.

Note that the display of the UI screen is not necessarily used. For example, information regarding the initiator apparatus may be presented using sounds, and the above-described "OK" and "NO" selections may be accepted using a key, a physical button, or the like provided in the responder apparatus. That is, an optional information presenting method and operation accepting method that allow the user to check the partner apparatus and determine whether or not communication parameter setting processing can be executed may be used.

Also, although an example in which information for executing communication parameter setting processing is transmitted and received between communication apparatuses utilizing the image of a QR code (registered trademark) was described in the above-described embodiment, the present invention is not limited thereto. For example, wireless communication such as Near Field Communication (NFC) or Bluetooth (registered trademark) may be used, instead of capturing a QR code (registered trademark). Also, wireless communication such as IEEE 802.11ad or TransferJet (registered trademark) may be used. Note that information that can be read by a user may be used, instead of code information such as a QR code. For example, a configuration may be adopted in which predetermined character strings are displayed, the user inputs these character strings after an application is activated, and thus information that is similar to information obtained by capturing a QR code described above is obtained.

Although a case where communication is performed between communication apparatuses through wireless LAN conforming to IEEE 802.11 standard series was described in the above-described embodiment, the present invention is not limited thereto. For example, UWB (Ultra Wide Band) such as wireless USB, wireless 1394, WINET, and a wireless communication technology such as Bluetooth (registered trademark), ZigBee, and NFC may be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-084476, filed Apr. 25, 2018 which is hereby incorporated by reference herein in its entirety.

What is claimed is:

1. A communication apparatus comprising:
one or more processors; and
one or more memories including instructions that, when executed by the one or more processors, cause the communication apparatus to:
determine, based on a first user input, whether the communication apparatus operates as a configurator in a setting processing of a parameter required for establishing a connection;
obtain a public key associated with another apparatus;
display, in a case where the public key is obtained and the communication apparatus operates as the configurator, information to accept a second user input indicating whether or not to execute the setting processing a with the other apparatus;
in a case where the second user input indicating that the setting processing with the other apparatus is to be executed has been accepted, transmit, to the other apparatus, a request regarding authentication processing in the setting processing, wherein the request includes information regarding the public key, and
in a case where the second user input indicating that the setting processing with the other apparatus is not to be executed has been accepted, not transmit, to the other apparatus, the request regarding authentication processing in the setting processing; and
execute the setting processing with the other apparatus in a case where a response to the request is received from the other apparatus.

2. The communication apparatus according to claim 1, wherein the public key associated with the other apparatus is obtained by capturing an image displayed by the other apparatus.

3. The communication apparatus according to claim 1, wherein the public key associated with the other apparatus is obtained by using a wireless communication.

4. The communication apparatus according to claim 1, wherein the setting processing is based on Device Provisioning Protocol, DPP, and the request is a DPP Authentication Request.

5. The communication apparatus according to claim 1, wherein the setting processing is executed with the other apparatus in a case where a response to the request is received from the other apparatus, wherein the response indicates a successful authentication.

6. The communication apparatus according to claim 1, wherein the instructions further cause the communication apparatus to control, based on a role of the communication apparatus in the setting processing, whether to display the information regarding the other apparatus.

7. The communication apparatus according to claim 1, wherein the communication parameter includes at least one of a SSID (Service Set Identifier), an encryption method, an encryption key, an authentication method and an authentication key, and wherein the communication parameter is provided to the other apparatus.

8. The communication apparatus according to claim 7, wherein the other apparatus, to which the communication parameter is provided, uses the communication parameter to establish a wireless connection.

9. The communication apparatus according to claim 1, wherein the communication apparatus determines, based on a third user input, that the communication apparatus operates as an enrollee in the setting processing.

10. A communication apparatus comprising:
one or more processors; and
one or more memories including instructions that, when executed by the one or more processors, cause the communication apparatus to:
receive, from another apparatus having obtained a public key associated with the communication apparatus, a request regarding authentication processing in setting processing of a communication parameter required for establishing a connection, wherein the request includes information regarding a public key;
accept, after receiving the request regarding the authentication processing in setting processing, a user input indicating whether or not setting processing of the communication parameter required for establishing the connection is to be executed;
in a case where the user input indicating that the setting process with the other apparatus is to be executed has been accepted, execute the setting processing with the other apparatus; and
in a case where the user input indicating that the setting process with the other apparatus is not to be executed has been accepted, not execute the setting processing.

11. The communication apparatus according to claim 10, wherein the setting processing is based on Device Provisioning Protocol, DPP, and the request is a DPP Authentication Request.

12. The communication apparatus according to claim 10, wherein the communication parameter includes at least one of a SSID (Service Set Identifier), an encryption method, an encryption key, an authentication method and an authentication key, and wherein the communication parameter is received from the other apparatus.

13. A communication method executed by a communication apparatus, the method comprising:
determining, based on a first user input, whether the communication apparatus operates as a configurator in setting processing of a parameter required for establishing a connection;

obtaining a public key associated with another apparatus;
displaying, in a case where the public key is obtained and the communication apparatus operates as the configurator, information to accept a second user input indicating whether or not to execute the setting processing with the other apparatus;
in a case where the second user input indicating that the setting processing with the other apparatus is to be executed has been accepted, transmitting, to the other apparatus, a request regarding authentication processing in the setting processing, wherein the request includes information regarding the public key, and
in a case where the second user input indicating that the setting processing with the other apparatus is not to be executed has been accepted, not transmit, to the other apparatus, the request regarding authentication processing in the setting processing; and
executing the setting processing with the other apparatus in a case where a response to the request is received from the other apparatus.

14. A communication method executed by a communication apparatus, the method comprising:
receiving, from another apparatus having obtained a public key associated with the communication apparatus, a request regarding authentication processing in setting processing of a communication parameter required for establishing a connection, wherein the request includes information regarding a public key;
accepting, after receiving the request regarding the authentication processing in setting processing, a user input indicating whether or not setting processing of the communication parameter required for establishing the connection is to be executed;
in a case where the user input indicating that the setting process with the other apparatus is to be executed has been accepted, executing the setting processing with the other apparatus; and
in a case where the user input indicating that the setting process with the other apparatus is not to be executed has been accepted, not executing the setting processing.

15. A non-transitory computer-readable-storage medium that stores a program for causing a computer included in a communication apparatus to:

determine, based on a first user input, whether the communication apparatus operates as a configurator in a setting processing of a parameter required for establishing a connection;
obtain a public key associated with another apparatus;
display, in a case where the public key is obtained and the communication apparatus operates as the configurator, information to accept a second user input indicating whether or not to execute the setting processing with the other apparatus;
in a case where the second user input indicating that the setting processing with the other apparatus is to be executed has been accepted, transmit, to the other apparatus, a request regarding authentication processing in the setting processing, wherein the request includes information regarding the public key, and
in a case where the second user input indicating that the setting processing with the other apparatus is not to be executed has been accepted, not transmit, to the other apparatus, the request regarding authentication processing in the setting processing; and
execute the setting processing with the other apparatus in a case where a response to the request is received from the other apparatus.

16. A non-transitory computer-readable-storage medium that stores a program for causing a computer included in a communication apparatus to:
receive, from another apparatus having obtained a public key associated with the communication apparatus, a request regarding authentication processing in setting processing of a communication parameter required for establishing a connection, wherein the request includes information regarding a public key;
accept, after receiving the request regarding the authentication processing in setting processing, a user input indicating whether or not setting processing of the communication parameter required for establishing the connection is to be executed;
in a case where the user input indicating that the setting process with the other apparatus is to be executed has been accepted, execute the setting processing with the other apparatus; and
in a case where the user input indicating that the setting process with the other apparatus is not to be executed has been accepted, not execute the setting processing.

* * * * *